United States Patent
Wang et al.

(10) Patent No.: US 8,954,004 B1
(45) Date of Patent: Feb. 10, 2015

(54) SYSTEMS AND METHODS FOR ACCESSING WEBSITES USING SMARTPHONES

(71) Applicants: Bin Wang, Jiangsu (CN); Zeyi Huangfu, Jiangsu (CN); Yun Zhang, Jiangsu (CN)

(72) Inventors: Bin Wang, Jiangsu (CN); Zeyi Huangfu, Jiangsu (CN); Yun Zhang, Jiangsu (CN)

(73) Assignee: Trend Micro Incorporated, Tokyo (JP)

( * ) Notice: Subject to any disclaimer, the term of this patent is extended or adjusted under 35 U.S.C. 154(b) by 189 days.

(21) Appl. No.: 13/623,444

(22) Filed: Sep. 20, 2012

(51) Int. Cl.
*H04Q 7/00* (2006.01)
(52) U.S. Cl.
USPC ......... 455/41.1; 455/41.2; 455/410; 455/411; 455/557
(58) Field of Classification Search
CPC ................................ H04W 4/00; H04W 88/04
USPC ....................... 455/41.1, 41.2, 410, 557, 411; 340/572.1
See application file for complete search history.

(56) References Cited

U.S. PATENT DOCUMENTS

| | | | |
|---|---|---|---|
| 7,962,369 B2 * | 6/2011 | Rosenberg | ................... 705/26.1 |
| 8,032,930 B2 | 10/2011 | Hicks | |
| 8,055,587 B2 | 11/2011 | Delia et al. | |
| 8,056,118 B2 | 11/2011 | Piliouras | |
| 8,108,231 B2 | 1/2012 | Boruff et al. | |
| 8,151,328 B1 | 4/2012 | Lundy et al. | |
| 8,161,545 B2 | 4/2012 | Craine | |
| 8,213,906 B2 | 7/2012 | Chen | |
| 8,255,452 B2 | 8/2012 | Piliouras | |
| 8,260,686 B2 | 9/2012 | Wirth, Jr. | |
| 8,261,087 B2 | 9/2012 | Fort et al. | |
| 8,347,103 B2 * | 1/2013 | Jones et al. | .................... 713/184 |
| 8,396,990 B2 * | 3/2013 | Cremin et al. | ................. 709/245 |
| 2010/0273526 A1 * | 10/2010 | Rajan et al. | .................... 455/557 |
| 2011/0147451 A1 * | 6/2011 | Bakshi | ........................... 235/379 |

* cited by examiner

*Primary Examiner* — Ajit Patel
*Assistant Examiner* — Julio Perez
(74) *Attorney, Agent, or Firm* — Okamoto & Benedicto LLP (57) ABSTRACT

An end user navigates to a website using a web browser running in a personal computer. A web application in the personal computer retrieves a uniform resource locator (URL) of the website and wirelessly transmits the URL to a smartphone that is proximate to and in wireless communication with the personal computer by near field communication (NFC). A smartphone app in the smartphone retrieves a password of the end user based on the URL of the website, and wirelessly transmits the password to the personal computer by NFC. In the personal computer, the web application uses the password to login to the website. The password may be automatically entered into a corresponding input field of a login webpage.

9 Claims, 10 Drawing Sheets

SYSTEMS AND METHODS FOR ACCESSING WEBSITES USING SMARTPHONES

BACKGROUND OF THE INVENTION

1. Field of the Invention

The present invention relates generally to computer security, and more particularly but not exclusively to methods and apparatus for accessing websites.

2. Description of the Background Art

Computer end users need to generate and remember many account names and passwords to access different websites. The password, in particular, needs to be protected and kept secret to prevent unauthorized access. An end user may choose a strong, e.g., long and complicated, password for improved security. However, strong passwords are difficult to remember. On the other hand, weak, e.g., simple and short, passwords are easier to remember but poses security risks because they are relatively easy to guess.

SUMMARY

In one embodiment, an end user navigates to a website using a web browser running in a personal computer. A web application in the personal computer retrieves a uniform resource locator (URL) of the website and wirelessly transmits the URL to a smartphone that is proximate to and in wireless communication with the personal computer by near field communication (NFC). A smartphone app in the smartphone retrieves a password of the end user based on the URL of the website, and wirelessly transmits the password to the personal computer by NFC. In the personal computer, the web application uses the password to login to the website. The password may be automatically entered into a corresponding input field of a login webpage.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
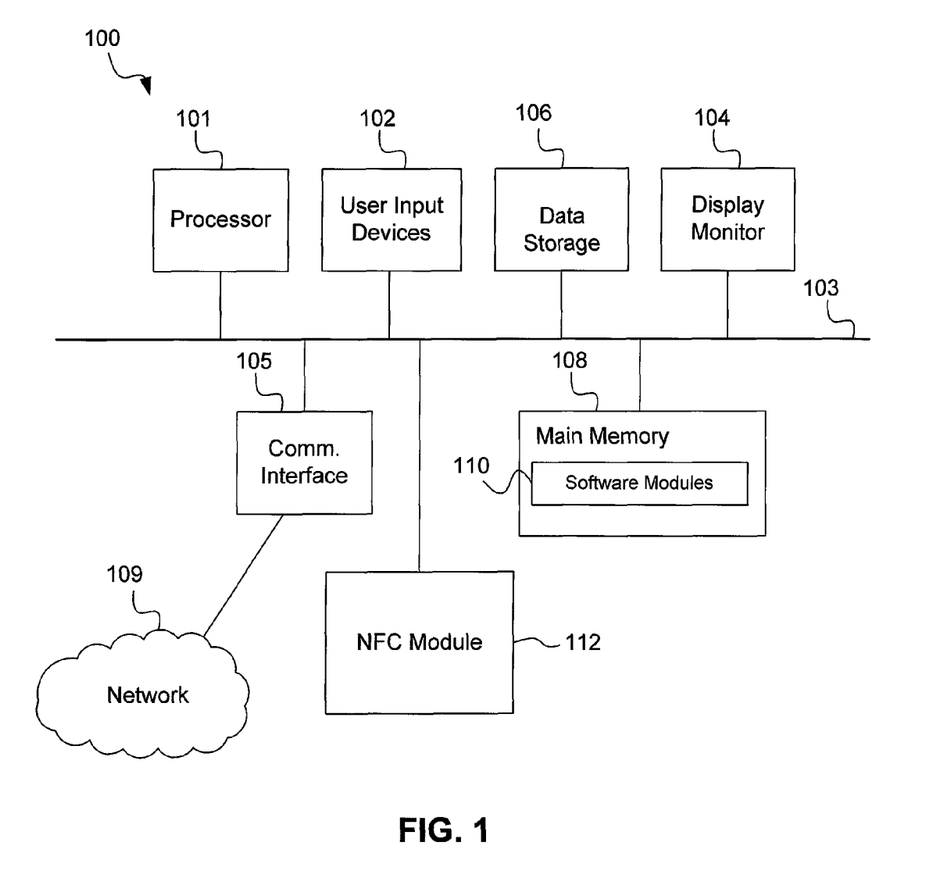
FIG. 1 shows a schematic diagram of a computer that may be employed with embodiments of the present invention.

FIG. 1 shows a schematic diagram of a computer 100 that may be employed with embodiments of the present invention. The computer 100 may be employed as a smartphone, personal computer, and other computers described below. The computer 100 may have fewer or more components to meet the needs of a particular application. The computer 100 may include a processor 101. The computer 100 may have one or more buses 103 coupling its various components. The computer 100 may include one or more user input devices 102 (e.g., keyboard, keypad, touchscreen), one or more data storage devices 106 (e.g., hard drive, flash memory, Universal Serial Bus memory), a display monitor 104 (e.g., liquid crystal display, flat panel monitor), one or more communication interfaces 105 (e.g., network adapter, modem, cellular interface), and a main memory 108 (e.g., random access memory). The network interface 105 may be coupled to a communication network 109 (e.g., computer network, Internet, cellular network).

The computer 100 may further include a near field communication (NFC) module 112. For example, the NFC module 112 may comprise an NFC reader coupled to a bus or port when the computer 100 is configured as a personal computer. As another example, the NFC module 112 may comprise an integrated NFC module when the computer 100 is employed as a smartphone. As is well-known, NFC is a form of wireless communication that allows for simplified transactions, data exchange, and wireless connection between two devices in close proximity to each other, usually by no more than a few centimeters. NFC is supported by major communication vendors, such as NOKIA, SAMSUNG, GOGGLE, VERIZON WIRELESS, AT&T, and many financial organizations, such as VISA and MASTERCARD.

The computer 100 is a particular machine as programmed with software modules 110. The software modules 110 comprise computer-readable program code stored non-transitory in the main memory 108 for execution by the processor 101. As an example, the software modules 110 may comprise a web application and a web browser when the computer 100 is configured as a personal computer. As another example, the software modules 110 may comprise a smartphone app, a smartphone web browser, and a smartphone web application when the computer 100 is configured as a smartphone. The computer 100 may be configured to perform its functions by executing the software modules 110. The software modules 110 may be loaded from the data storage device 106 to the main memory 108.

Figure 2:
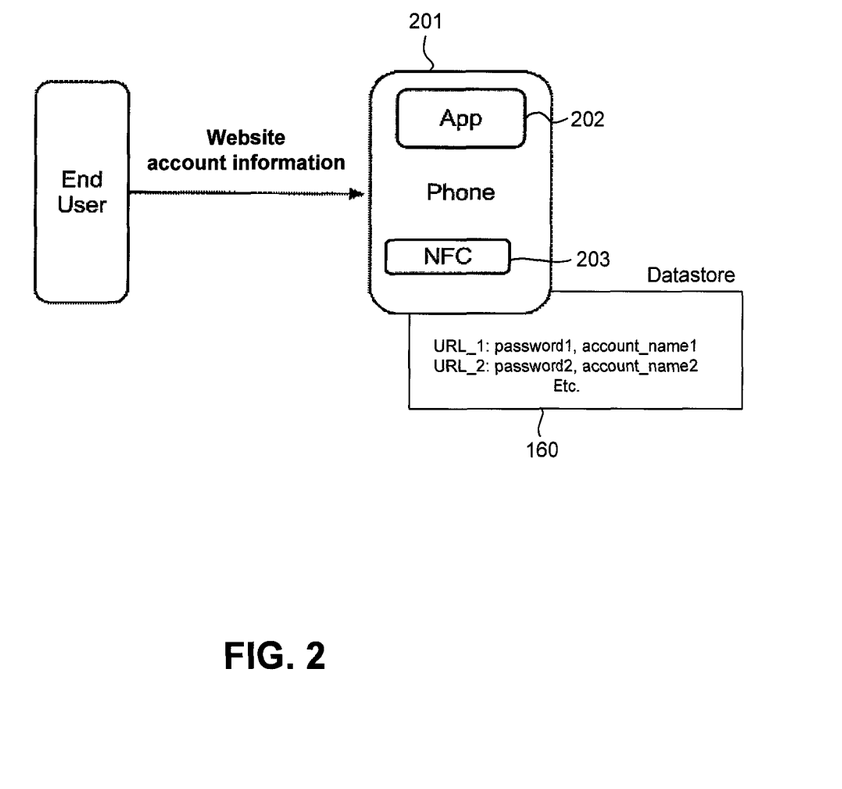
FIG. 2 schematically illustrates an end user entering his account name, password, and/or other account information for various websites into a smartphone in accordance with an embodiment of the present invention.

FIG. 2 schematically illustrates an end user entering his account name, password, and/or other account information for accessing various websites into a smartphone 201 in accordance with an embodiment of the present invention. As is well known, a smartphone is a mobile telephone with processing capability that allows it to perform data communications over computer networks and run application programs (so called "apps") and other computer-readable program code. In one embodiment, the smartphone 201 comprises an NFC-enabled smartphone that runs the ANDROID operating system. The smartphone 201 may include an NFC module 203 for communicating with other NFC-enabled devices, such as personal computers with NFC readers, by NFC protocol.

In the example of FIG. 2, the smartphone 201 includes a smartphone app 202. The smartphone app 202 may comprise an application program for a smartphone, e.g., an ANDROID app. In one embodiment, the smartphone app 202 comprises computer-readable program code that sends and receives data to and from a personal computer by NFC, generates and stores passwords and other account information for accessing websites, automatically determines and retrieves account information for particular websites by uniform resource locator (URL) or other network identifier, and backups and retrieves stored account information to and from cloud data storage.

The end user may obtain the smartphone app 202 from an app store, for example. The end user may set an authentication password to activate or enable the smartphone app 202, then add his passwords and other account information for accessing websites into the smartphone app 202. The smartphone app 202 may be configured to store account information by URL of the websites. For example, the smartphone app 202 may have a datastore 160 for storing passwords, account names, and or other account information for URLs of login pages of websites. When the smartphone app 202 receives a URL, the smartphone app 202 consults the datastore 160 for the URL, and retrieves the account name and password associated with the URL. As will be more apparent below, because the end user does not necessarily have to remember the password, the password may be chosen to be secure and complicated.

For security purposes, the smartphone app 202 may be configured to perform its function only when so enabled by the end user, such as upon receiving an authentication password or other authentication input, e.g., biometrics if the smartphone 201 is so enabled, from the end user.

Figure 3:
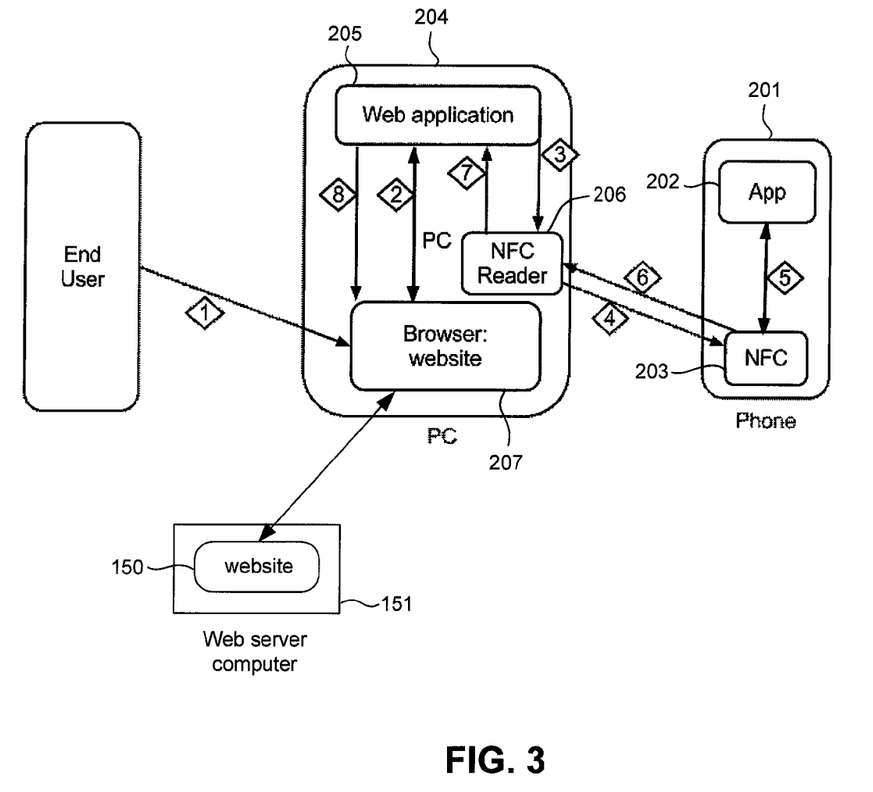
FIG. 3 schematically illustrates a scenario where a smartphone is employed to automatically login to a website that is being accessed by an end user using a personal computer in accordance with an embodiment of the present invention.

FIG. 3 schematically illustrates a scenario where the smartphone 201 is employed to automatically login to a website that is being accessed by an end user using a personal computer in accordance with an embodiment of the present invention. In the example of FIG. 3, the personal computer 204 employed by the end user includes a web application 205, a web browser 207, and an NFC reader 206. The personal computer 204 may be a desktop computer, laptop computer, or other general-purpose computer employed by users to access websites. The web browser 207 may comprise a commercially-available web browser. The NFC reader 206 may comprise an NFC module that allows for two-way communication, i.e., send and receive, with an NFC-enabled device, such as the smartphone 201. The personal computer 204 is proximate to and in wireless communication with the smartphone 201 by NFC. As can be appreciated, the NFC connection between the personal computer 204 and the smartphone is not the same communications channel as the connection between the personal computer 204 and the web server computer 151. This advantageously prevents man-in-the-middle attacks that steal passwords.

In one embodiment, the web application 205 comprises computer-readable program code that hooks URLs of websites communicating with the web browser 207, provides the URLs to the smartphone app 202 by NFC, and receives passwords and other account information of the end user for the websites also by NFC. In one embodiment, the web application 205 is implemented as a plug-in to the web browser 207. The web application 205 may monitor the navigation of the web browser 207 to various websites and retrieve the URLs of the websites for transmission to the smartphone app 202 when the end user places the smartphone 201 in wireless communication range with the NFC reader 206 (e.g., by placing the smartphone 201 near the NFC reader 206 or touching the smartphone 201 to the NFC reader 206). For example, the web application 205 may retrieve the URL of a login webpage displayed by the web browser 207 when the NFC reader 206 indicates to the web application 205 that the smartphone 201 is detected to be in range for NFC. The web application 205 may be configured to parse a webpage (e.g., by searching hypertext marked up language (HTML) code) served by a website to locate input fields for entering an account name, a password, and/or other account information for accessing the website.

The web application 205 may also monitor the navigation of the web browser 207 to various websites and detect when a webpage served by a website includes an input field for a password, account name, or other account information. Upon detection of the input field, the web application 205 may be configured to notify the end user (e.g., sound a beep or alarm, display a message box) to put the smartphone 201 within NFC range of the NFC reader 206 to initiate the login process if the end user chooses to do so.

Figure 4:
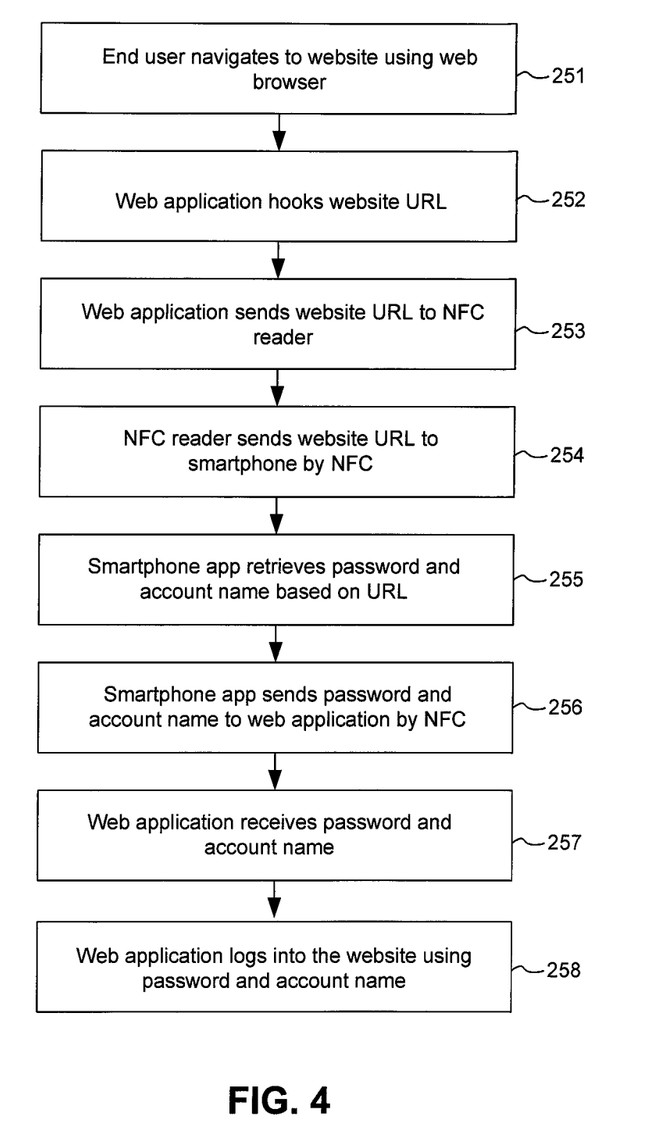
FIG. 4 shows a flow diagram of a method of automatically logging into a website that is accessed using a personal computer in accordance with an embodiment of the present invention.

An example operation of the components shown in FIG. 3 is now described with reference to FIG. 4, which shows a flow diagram of a method of automatically logging into a website that is accessed using a personal computer in accordance with an embodiment of the present invention. In the example operation, the end user navigates to a website 150 using the web browser 207 (FIG. 4, step 251; FIG. 3, arrow 1). The website 150 may be hosted by a web server computer 151 and is accessible over the Internet. For example, the web browser 207 may communicate with the website 150 over a wired or wireless computer network. In the example of FIGS. 3 and 4, the website 150 requires an account name, a password, and/or other account information, for access. The website 150 may provide e-mail, financial, social networking, retail, or other services that require user authentication. The website 150 serves a login webpage with a particular URL to the web browser 207, the login webpage having fields for entering an account name and a password.

The web application 205 monitors the navigation of the web browser 207, and retrieves, e.g., by hooking, the URL of the login webpage served by the website 150 to the web browser 207 (FIG. 4, step 252; FIG. 3, arrow 2) when the smartphone 201 is detected to be in range for NFC. The web application 205 then sends the URL of the login webpage to the smartphone app 202 by NFC. In particular, the web application 205 sends the URL to the NFC reader 206 (FIG. 4, step 253; FIG. 3, arrow 3), which wirelessly transmits the URL to the smartphone app 202 by way of the NFC module 203 (FIG. 4, step 254; FIG. 3, arrow 4). The smartphone app 202 receives the URL from the NFC module 203 and retrieves the password and account name (and/or other account information) of the end user for the website based on the URL of the login webpage (FIG. 4, step 255; FIG. 3, arrow 5). The smartphone app 202 may so inform the user when a URL has no associated account information. In that case, the end user may enter his account information into the smartphone app 202 as in the example of FIG. 2.

Continuing the example of FIGS. 3 and 4, the smartphone app 202 wirelessly transmits the password and account name of the end user for the website to the web application 205 in the personal computer 204 by way of the NFC module 203 (FIG. 4, step 256; FIG. 3, arrow 6). The web application 205 receives the password and account name from the NFC reader 206 (FIG. 4, step 257; FIG. 3, arrow 7). The web application 205 thereafter logs into the website 150 by, for example, automatically entering the password and account name in corresponding input fields on the login webpage served by the website 150 (FIG. 4, step 258; FIG. 3, arrow 8). Automatically entering the password and account name advantageously prevents keyboard loggers that may be present in the personal computer 204 from stealing the password and account name.

Figure 5:
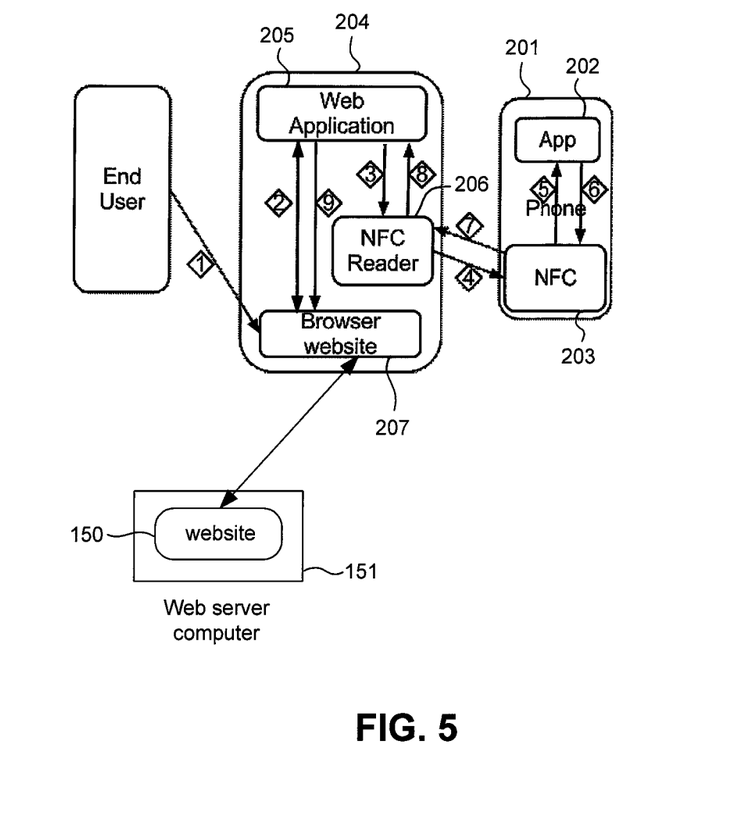
FIG. 5 schematically illustrates a scenario where a smartphone is employed to automatically generate a password, account name, and/or other account information for a website in accordance with an embodiment of the present invention.

FIG. 5 schematically illustrates a scenario where the smartphone 201 is employed to automatically generate a password, account name, and/or other account information for a website in accordance with an embodiment of the present invention. An example of operation of the components shown in FIG. 5 is described with reference to the flow diagram of FIG. 6, which shows a flow diagram of a method of automatically generating a password, account name, and/or other account information for a website in accordance with an embodiment of the present invention. In the example operation, the end user registers with the website 150 for the first time and enables the web application 205 to initiate automatic generation of account name, password, and/or other account information (FIG. 6, step 261; FIG. 5, arrow 1). In response, the web application 205 hooks website information of the website 150, which is hosted by the web server computer 151 (FIG. 6, step 262; FIG. 5, arrow 2). The website information comprises information that allows the smartphone app 202 to identify the website, such as the URL of a login webpage served by the website, the domain name of the website, and/or the digital certificate of the website if the website supports secure communication.

Figure 6:
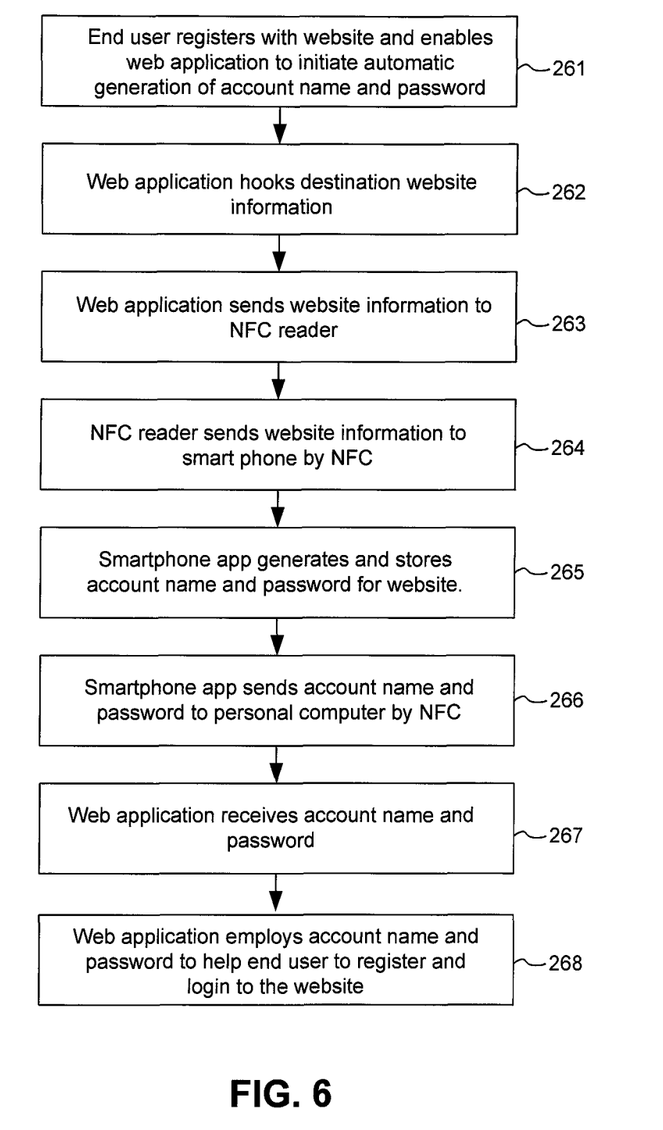
FIG. 6 shows a flow diagram of a method of automatically generating a password, account name, and/or other account information for a website in accordance with an embodiment of the present invention.

When the smartphone 201 is detected to be in range for NFC, the web application 205 sends the website information to the NFC reader 206 (FIG. 6, step 263; FIG. 5, arrow 3), which in turn wirelessly transmits the website information to the smartphone 201 by way of the NFC module 203 (FIG. 6, step 264; FIG. 5, arrow 4). The smartphone app 202 receives the website information from the NFC module 203, and automatically generates and stores an account name and a password for the website (FIG. 6, step 265; FIG. 5, arrow 5). For example, the smartphone app 202 may randomly generate an account name, a password, and/or other account information for the website and store them according to the URL of the website as obtained from the website information. Because the resulting password and account name may be automatically entered into corresponding input fields of a login webpage and do not have to be remembered by the end user, the smartphone app 202 may generate secure and complicated passwords and/or account names for improved security.

Continuing the example of FIGS. 5 and 6, the smartphone app 202 wirelessly transmits the account name and password to the personal computer 204 by NFC (FIG. 6, step 266; FIG. 5, arrows 6 and 7). The web application 205 receives the account name and password from the NFC reader 206 (FIG. 6, step 267; FIG. 5, arrow 8). The web application 205 employs the account name and password to help the end user to register and login to the website 150 (FIG. 6, step 268; FIG. 5, arrow 9). For example, the web application 205 may enter the account name and password to corresponding input fields on the webpage served by the website 150, e.g., by parsing the HTML code of the webpage to locate the input fields.

In another embodiment, instead of using the smartphone 202 to automatically login to a website that is accessed using a personal computer, the smartphone 202 itself is employed to access the website. This embodiment is now explained with reference to FIGS. 7 and 8.

Figure 7:
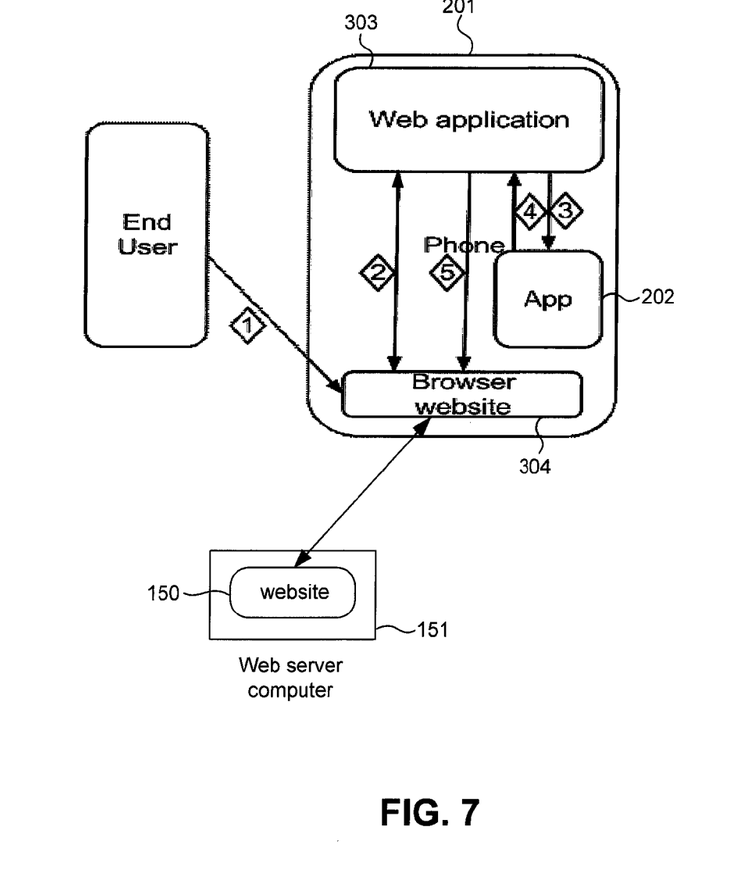
FIG. 7 schematically illustrates a scenario where an end user uses a smartphone to navigate to and automatically login to a website in accordance with an embodiment of the present invention.

FIG. 7 schematically illustrates a scenario where the end user uses the smartphone 201 to navigate to and automatically login to the website 150 in accordance with an embodiment of the present invention. In the example of FIG. 7, the smartphone 201 includes, in addition to the smartphone app 202, a smartphone web application 303 and a smartphone web browser 304. The smartphone web browser 304 may comprise a web browser for smartphones, such as web browsers that are operable under the ANDROID operating system.

In one embodiment, the web application 303 comprises computer-readable program code that hooks a URL (or other network identifier) of a website communicating with the smartphone web browser 304, provides the URL to the smartphone app 202, receives an account name, password, and/or other account information for the website from the smartphone app 202, and logs into the website using the account name, password, and or other account information received from the smartphone app 202. The web application 303 may be implemented as a local hooking app, plug-in, or some other computer-readable program code.

Figure 8:
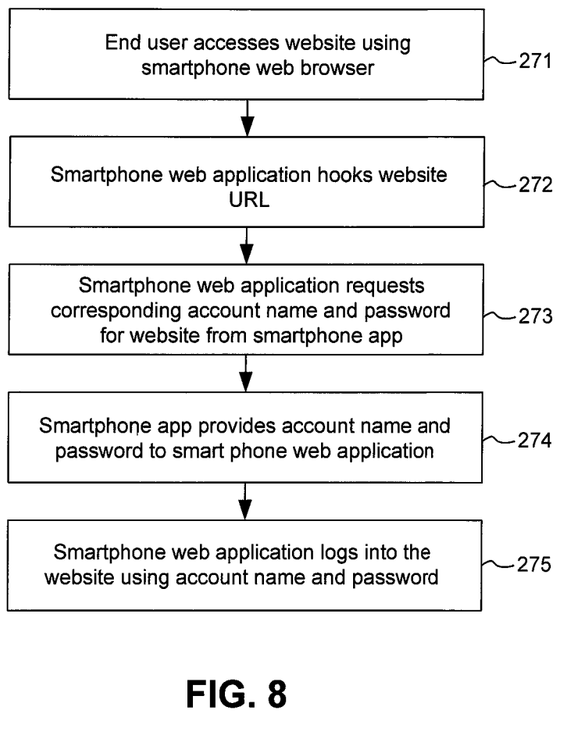
FIG. 8 shows a flow diagram of a method of automatically logging into a website that is accessed using a smartphone in accordance with an embodiment of the present invention.

An example operation of the components shown in FIG. 7 is now described with reference to FIG. 8, which shows a flow diagram of a method of automatically logging into a website that is accessed using a smartphone in accordance with an embodiment of the present invention. In the example of FIGS. 7 and 8, the smartphone app 202 generates and stores account names, passwords, and/or other account information for particular websites as previously described. In the example operation, the end user employs the smartphone web browser 304 to navigate to the website 150, which is hosted by the web server computer 151 (FIG. 8, step 271; FIG. 7, arrow 1). The smartphone web browser 304 may communicate with the web server computer 151 over the Internet, for example, such as through a 3G/4G connection. The smartphone web application 303 hooks the URL of the website 150 (FIG. 8, step 272; FIG. 7, arrow 2). The smartphone web application 303 provides the URL of the website 150 (e.g., the URL of a login webpage of the website 150) to the smartphone app 202, and requests the smartphone app 202 for the end user's account name and password for the website (FIG. 8, step 273; FIG. 7, arrow 3). The smartphone app 202 finds the account name and password that correspond to the URL, and provides the account name and password to the smartphone web application 303 (FIG. 8, step 274; FIG. 7, arrow 4). The smartphone web application 303 automatically logs into the website 150 using the account name and password received from the smartphone app 202, for example by inputting the account name and password to corresponding input fields on the website's login webpage (FIG. 8, step 275; FIG. 7, arrow 5).

URLs and corresponding account information and other information stored by the smartphone app 202 may be stored in cloud data storage to allow for crash recovery or to facilitate replacement of the smartphone 201. This embodiment of the present invention is now explained with reference to FIGS. 9 and 10.

Figure 9:
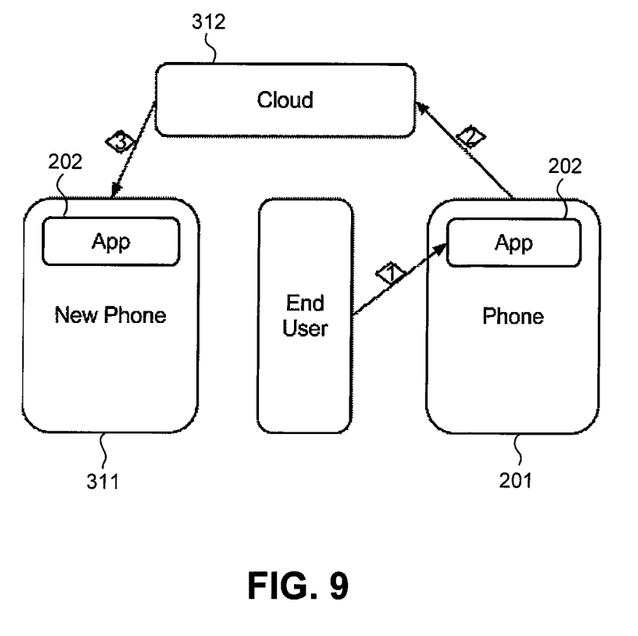
FIG. 9 schematically illustrates a scenario where account information stored in smartphones is synchronized through cloud data storage in accordance with an embodiment of the present invention.
Figure 10:
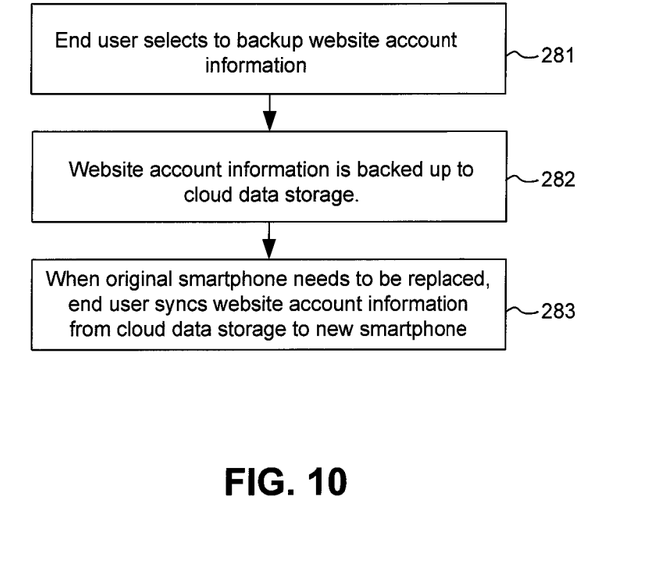
FIG. 10 shows a flow diagram of a method of synchronizing account information in accordance with an embodiment of the present invention.

FIG. 9 schematically illustrates a scenario where account information stored in smartphones is synchronized through cloud data storage in accordance with an embodiment of the present invention. In the example of FIG. 9, the smartphone 311 is a replacement for the smartphone 201. An example operation of the components shown in FIG. 9 is now explained with reference to FIG. 10, which shows a flow diagram of a method of synchronizing account information in accordance with an embodiment of the present invention. In the example operation, the end user activates the smartphone app 202 running in the smartphone 201 to perform backup of account information, which includes account names, passwords, and/or other account information for accessing websites (FIG. 10, step 281; FIG. 9, arrow 1). In response, the smartphone app 202 running in the smartphone 201 connects to the cloud data storage 212 to store the account information therein (FIG. 10, step 282; FIG. 9, arrow 2). The smartphone app 202 may communicate with the cloud data storage 312 over the Internet.

When the smartphone 201 needs to be replaced (e.g., lost, damaged, needs to be upgraded), the end user may replace the smartphone 201 with another NFC-enabled smartphone 311 having the same or similar configuration. The end user may activate the smartphone app 202 running in the smartphone 311 to synchronize account information from the cloud data storage 312 to the smartphone 311 (FIG. 10, step 283; FIG. 9, arrow 3). For example, the smartphone app 202 may be configured to retrieve the latest account information from the cloud data storage 312 to update or replace the account information stored in the smartphone 311.

Systems and methods for accessing websites using smartphones have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of accessing a website, the method comprising:
  in a smartphone, automatically generating a password of an end user for a website;
  in the smartphone, automatically generating an account name of the end user for the website;
  receiving a login webpage of the website in a personal computer;
  retrieving a uniform resource locator (URL) of the login webpage in the personal computer;
  wirelessly transmitting the URL of the login webpage from the personal computer to an NFC module of the smartphone by near field communication (NFC) that is a close proximity communication connection between the personal computer and the smartphone;
  in the smartphone, retrieving the password and the account name of the end user for the website based on the URL of the login webpage;
  wirelessly transmitting the password and the account name from the smartphone to an NFC reader of the personal computer by NFC; and
  in the personal computer, wirelessly receiving the password and the account name from the smartphone by NFC and using the password and the account name received from the smartphone to login to the website.

2. The method of claim 1 wherein the password is automatically entered into a password input field of the login webpage displayed in the personal computer.

3. The method of claim 2 wherein the URL of the login webpage is retrieved from a web browser running in the personal computer.

4. The method of claim 1 further comprising:
  in the personal computer, automatically entering the password and the account name received from the smartphone into corresponding input fields in the login webpage.

5. A system for accessing a website, the system comprising:
  a personal computer comprising a near field communication (NFC) reader, the personal computer retrieves a uniform resource locator (URL) of a website in communication with a web browser, wirelessly transmits the URL to a smartphone that is proximate to and in wireless communication with the personal computer by NFC, wirelessly receives a password and an account name of an end user for the website from the smartphone by NFC through the NFC reader, and uses the password and the account name to login to the website; and
  a smartphone comprising an NFC module, the smartphone automatically generates the password, automatically generates the account name, receives the URL from the personal computer, retrieves the password and the account name based on the URL, and wirelessly transmits the password and the account name to the personal computer by NFC through the NFC module.

6. The system of claim 5 wherein the personal computer automatically enters the password and account name into corresponding input fields of a login webpage served by the website.

7. The system of claim 5 wherein the personal computer automatically enters the password into a password input field of a login webpage served by the website.

8. A method of accessing a website, the method comprising:
  in a smartphone, automatically generating a password for an end user for a website;
  in the smartphone, automatically generating an account name for the end user for the website;
  in a personal computer, wirelessly transmitting to a near field communication (NFC) module of the smartphone a uniform resource locator (URL) of a webpage served by the website to a web browser running in the personal computer;
  in the smartphone, retrieving the password and the account name for the website based on the URL of the webpage;
  wirelessly transmitting the password and the account name from the smartphone to an NFC reader of the personal computer by NFC that is a close proximity communication connection between the personal computer and the smartphone;
  wirelessly receiving the password and the account name in the personal computer; and
  in the personal computer, using the password and the account name to login to the website.

9. The method of claim 8 further comprising:
  automatically entering the password into a corresponding input field of the webpage.

* * * * *